Nov. 8, 1932.  A. RENSHAW  1,887,467
CLUTCH
Filed March 16, 1932  3 Sheets-Sheet 1
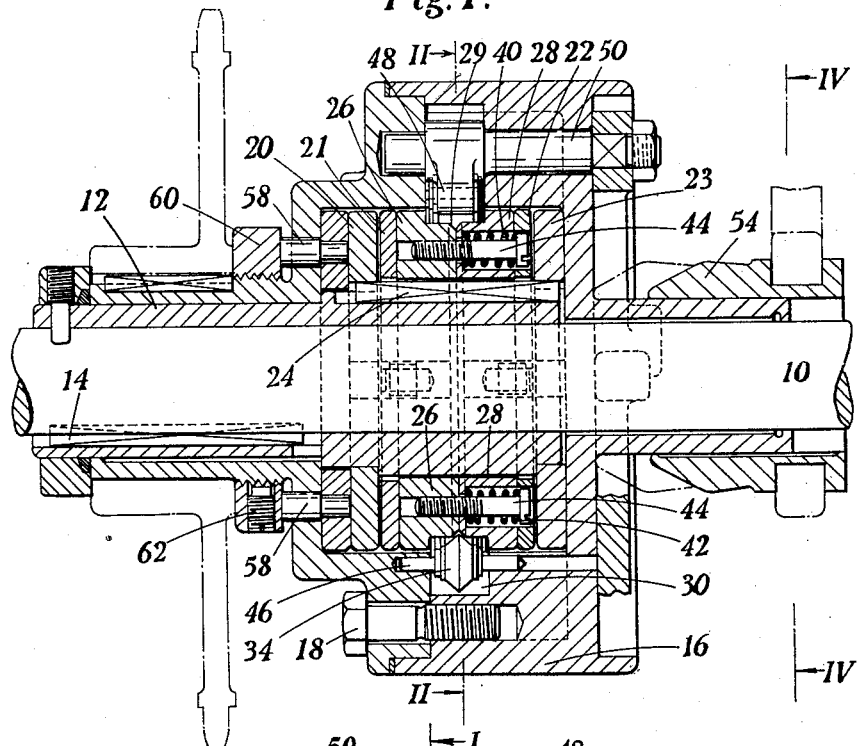

Nov. 8, 1932.  A. RENSHAW  1,887,467
CLUTCH
Filed March 16, 1932   3 Sheets-Sheet 2

INVENTOR
Alfred Renshaw
BY
ATTORNEY

Nov. 8, 1932.  A. RENSHAW  1,887,467

CLUTCH

Filed March 16, 1932  3 Sheets-Sheet 3

INVENTOR
Alfred Renshaw
BY
ATTORNEY

Patented Nov. 8, 1932

1,887,467

UNITED STATES PATENT OFFICE

ALFRED RENSHAW, OF DIDSBURY, MANCHESTER, ENGLAND, ASSIGNOR TO THE RENOLD & COVENTRY CHAIN COMPANY LIMITED, OF LONDON, ENGLAND, A BRITISH COMPANY

CLUTCH

Application filed March 16, 1932, Serial No. 599,300, and in Great Britain June 10, 1931.

This invention relates to plate clutches and its object is to provide a clutch the actuating mechanism of which is simple and efficient and in which centrifugal force tends to disengage the clutch.

According to this invention the plates of the clutch are pressed together by a wedging action exerted by a jointed-link chain extending circumferentially around the clutch members and carried by one of them. The wedging action may be brought about either by applying tension to the chain, or the chain may be arranged in zigzag form so that each pair of links acts in the manner of a toggle when pressure is applied to its ends. In either case the joint members of the chain may carry rollers which are double-conical in profile and cooperating with tapered surfaces on two annular wedge members to force these members in the axial direction to press the plates together when the rollers move inwards as a consequence of the application to it of tension or pressure as the case may be.

Figure 3:
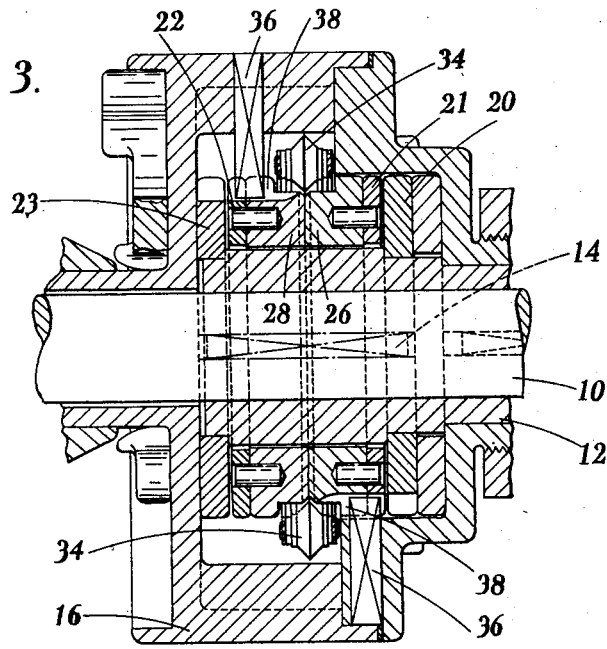
Figure 4:
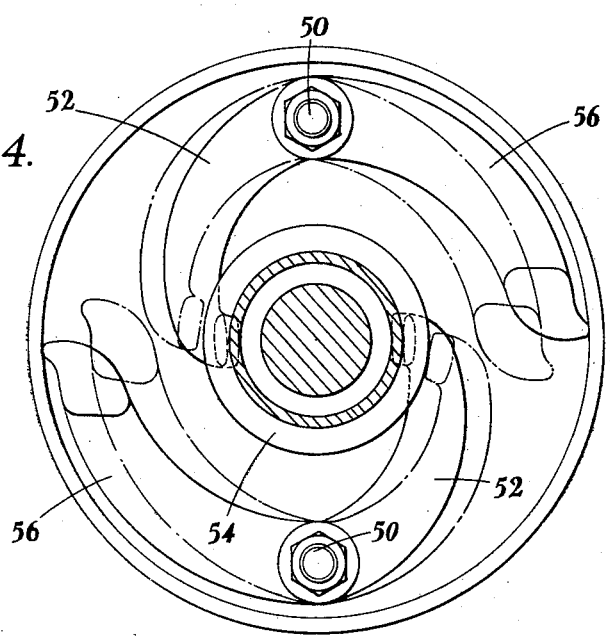
Figure 5:
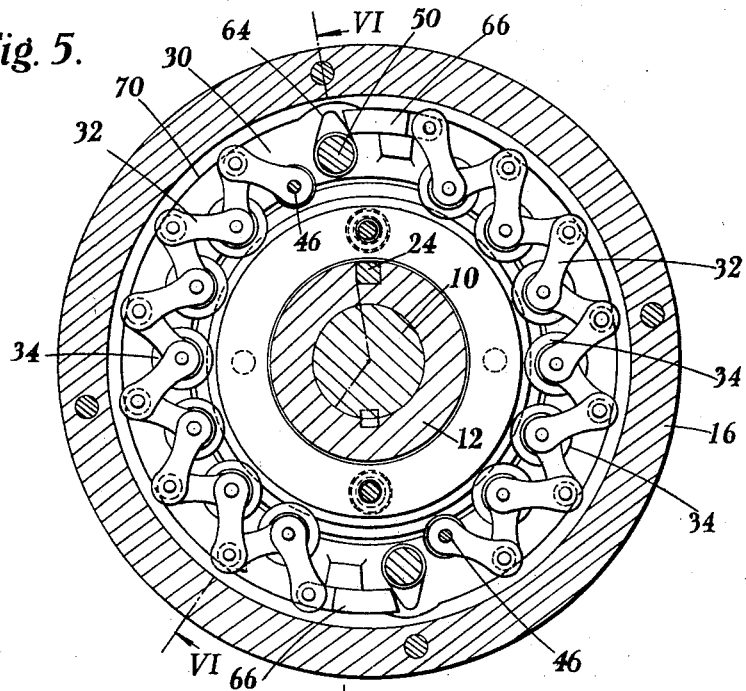
Figure 6:
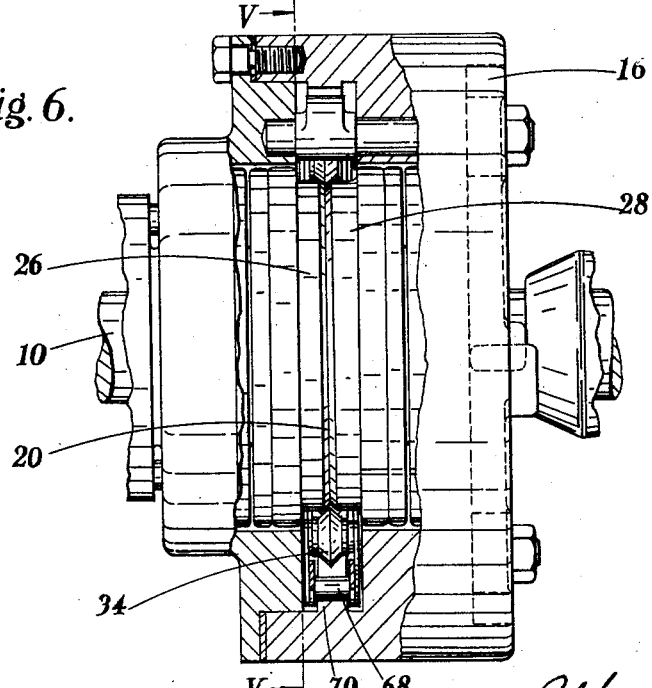

Two alternative embodiments of the invention are illustrated in the accompanying drawings, in which Figure 1 is a side elevation in section along the line I—I of Figure 2, of a preferred form of clutch, Figure 2 is a section along the line II—II in Figure 1, Figure 3 is a section along the line III—III in Figure 2, Figure 4 is a sectional end elevation, the section being taken along the line IV—IV in Figure 1, Figure 5 is a view, similar to Figure 2, of a modified form of clutch, in section along the line V—V in Figure 6, and Figure 6 is a side elevation thereof, in section along the line VI—VI in Figure 5.

Referring to Figures 1 to 4, a shaft 10 to be driven carries a sleeve 12 keyed to it as indicated at 14 and the driving member is an annular casing 16 in two parts secured together by bolts 18 and free to rotate on the sleeve and the shaft. Within the casing are two pairs of clutch plates, one pair 20, 21 at one end, and the other pair 22, 23 at the other end, of the casing. The two outer plates 20, 23 are keyed to the sleeve 12 by means of the key 24, but are free to slide thereon, and the inner plates 21, 22 are fixed to two hardened steel rings 26, 28 which abut together. The meeting faces of these two steel rings are bevelled at their outer edges, as indicated at 29, to form a V groove. There is an annular recess or groove 30 in the casing surrounding the V groove and two lengths of roller chain 32 are housed in this recess and occupy the two halves of its circumference. The rollers 34 of this chain are double-conical in form as clearly shown in Figure 1 and their angular edges fit into the V groove between the two steel rings. It will be appreciated that when the two chains are tensioned the rollers 34 will be forced inwards and their opposed conical surfaces co-operating with the bevels 29 will wedge apart the two rings 26, 28 and thus press the plates 21, 22 against the plates 20, 23. The rings 26, 28 are prevented from rotating but permitted to slide axially by means of two pins 36 (Figure 3) fixed in the casing and engaging in notches 38 in the edges of the rings. The wedging action of the rollers is opposed by springs 40 housed in recesses 42 in the ring 28 and abutting at one end against the bottom of these recesses and at the other end against the heads of screws 44 which extend through the recesses and are threaded into tapped holes in the ring 26. It will be clear that centrifugal force will tend to relieve the tension in the chains and therefore tend to disengage the clutch.

Each length of chain is anchored at one end by a pin 46 seated in a hole in the casing and is linked at its other end to one of two arms 48 fixed to short shafts 50 diametrically opposed to one another and journalled in the casing. The outer ends of these shafts carry arms 52 (Figure 4) which extend inwardly and are engaged by a taper bobbin 54 which can be moved axially by a fork, not shown, the taper surface of the bobbin forcing apart the ends of these arms and thereby turning the shafts 50 and causing the arms 48 to apply tension to the chains. Counterbalance arms 56 are also fixed to these shafts and are so disposed as shown in Figure 4 that they balance the centrifugal forces on the actuating arms.

The outer plate 20 is adjustable in the axial direction to enable wear to be taken up. This adjustment is effected by providing pins 58 fixed in the plate extending through holes in the adjacent end of the casing and engaged by a nut 60 threaded on to the hub of the casing, a locking screw 62 being provided for fixing the nut in any adjusted position.

It is preferred to employ two lengths of chain as described above and two tensioning shafts diametrically opposed, as thereby the various parts of the clutch are symmetrical and therefore balance, but if preferred a single length of chain extending nearly round the clutch may be employed, in which case the single tensioning shaft would need to be balanced by a suitable weight disposed opposite to it. It is evident that the members 26, 28 could be made to surround the chains 32, with their bevelled edges 29 facing inwardly, in which case the clutch would be engaged by applying pressure to the ends of the chain, instead of tension.

In the modified construction shown in Figures 5 and 6 the recess 30 for the chain is made somewhat deeper in the radial direction and the chains 32 are disposed in zigzag fashion so that each pair of links acts as a toggle. The bushes of the chain which occupy the circle of smaller radius are provided with double-conical rollers 34 and these rollers are forced into the V groove between the two rings 26, 28 by applying pressure to the ends of the chains instead of by applying tension. For this purpose the shafts 50 are provided with cams 64 operating on the ends of small sliding pieces 66 linked to the movable ends of the two chains, the other ends of which are anchored by means of pins 46 as in the first construction. The remaining chain rollers 68 are of ordinary form and co-operate with a track 70 within the casing. It will be appreciated that centrifugal force will tend to flatten out the zigzag formation of the chains and therefore tend to disengage the clutch as in the form first described. In this modified form also the two lengths of chain may be replaced by a single chain.

It will be evident that the invention may be applied to brakes as well as to clutches.

I claim:—

1. A clutch comprising in combination a driving member, a driven member, two clutch plates one carried by the driving member and the other carried by the driven member, a jointed-link chain carried by one of said members and extending circumferentially around said members, means for applying endwise force to said chain, and wedging means co-operating with said chain to press said clutch-plates together by a wedging action consequent on the application of force to the chain.

2. A clutch comprising in combination a driving member, a driven member, two clutch plates one carried by the driving member and the other carried by the driven member, a jointed-link chain carried by one of said members and extending circumferentially around said members, means for applying tension to said chain, and wedging means embraced by said chain and co-operating therewith to press said clutch-plates together by a wedging action resulting from the tension applied to the chain.

3. A clutch comprising in combination a driving member, a driven member, two clutch plates one carried by the driving member and the other carried by the driven member, a jointed-link chain carried by one of said members and extending circumferentially around said members, rollers wedge-shaped in cross-section mounted upon at least some of the joints of said chain, a wedge member co-operating with said rollers and movable axially to press said plates together, and means for applying endwise force to said chain to press the rollers radially against the wedge-member to move said member axially.

4. A clutch comprising in combination a driving member, a driven member, two clutch plates one carried by the driving member and the other carried by the driven member, a jointed-link chain carried by one of said members and extending circumferentially around said members, double-conical rollers carried by at least some of the joints of said chain, two wedge members abutting together with the edges of said rollers between the meeting faces of the said wedge-members, at least one of which is axially movable and abuts against one of the said clutch plates, and means for applying endwise force to said chain to press the rollers into the space between the wedge-members to wedge them apart.

5. A clutch comprising in combination a driving member, a driven member, two pairs of clutch plates spaced apart in the axial direction one plate of each pair being carried by the driving member and the other carried by the driven member, a jointed-link chain carried by one of said members and extending circumferentially around said members in a position intermediate said pairs of clutch plates, means for applying endwise force to said chain, and means interposed between said pairs of clutch plates and associated with said chain for converting the radial movement of parts of the chain consequent on the application of force thereto into axial movement causing the plates of both pairs to be pressed together.

6. A clutch comprising in combination a driving member, a driven member, two pairs of clutch plates spaced apart in the axial direction one plate of each pair being carried by the driving member and the other carried by the driven member, a jointed-link chain carried by one of said members and extending circumferentially around said members in a position intermediate said pairs of clutch plates, double-conical rollers carried by at least some of the joints of said chain, two annular wedge-members interposed between the said two pairs of clutch plates, and means for applying endwise force to said chain to press said rollers into the space between the wedge-members and thereby to force them apart and to press together the clutch-plates of both pairs.

7. A clutch comprising in combination a driving member, a driven member, two clutch plates one carried by the driving member and the other carried by the driven member, a jointed-link chain carried by one of said members and extending circumferentially around said members, the links of said chain being disposed in zigzag manner, double-conical rollers on alternate joints of said chain and cylindrical rollers on the remaining joints thereof, a circumferential track for the cylindrical rollers on that one of the clutch members which carries the chain, two wedge members at least one of which is axially movable and abuts against one of the said clutch plates, and means for applying endwise pressure to said chain to press the conical rollers into the space between the wedge members to wedge them apart.

8. A clutch comprising in combination a driving member, a driven member, two clutch plates one carried by the driving member and the other carried by the driven member, two jointed-link chains carried by one of said members and extending circumferentially around said members each chain occupying one half of the circumference of the clutch, separate means, conjointly operated, for applying endwise force to said chains said separate means being symmetrically disposed with respect to the axis of the clutch, and wedging means co-operating with said chains to press said clutch plates together by a wedging action consequent on the application of force to the chains.

In witness whereof I hereunto subscribe my name this 1st day of March, 1932.

ALFRED RENSHAW.